L. C. TRETHEWEY.
CAKE CUTTER.
APPLICATION FILED AUG. 9, 1920.

1,399,449.

Patented Dec. 6, 1921.

Laura C. Trethewey
INVENTOR

BY E. W. Bond
ATTORNEY

UNITED STATES PATENT OFFICE.

LAURA C. TRETHEWEY, OF STRATFORD, ONTARIO, CANADA.

CAKE-CUTTER.

1,399,449.　　　　　Specification of Letters Patent.　　Patented Dec. 6, 1921.

Application filed August 9, 1920. Serial No. 402,217.

*To all whom it may concern:*

Be it known that I, LAURA C. TRETHEWEY, a citizen of the Dominion of Canada, residing at Stratford, in the county of Perth and Province of Ontario, have invented certain new and useful Improvements in Cake-Cutters, of which the following is a specification.

This invention relates to cake cutters and has for its object to provide a means whereby a number of cookies, buns, or other cakes can be cut out of a rolled piece of dough into the shape desired.

A further object of my invention is to provide a simple and inexpensive construction whereby the greatest possible number of annular forms can be cut from a rolled dough surface.

A further object is to provide a novel means of making a cake cutter whereby I provide a central cutter formed from the ends of the outer cutters encircling the same.

With these and other objects in view, the invention consists in the construction, combination and arrangement of parts as will be hereinafter fully described, illustrated in the accompanying drawings, and pointed out in the claims hereunto appended.

Referring to the drawings like numerals designate like parts in the various drawings.

Figure 1:
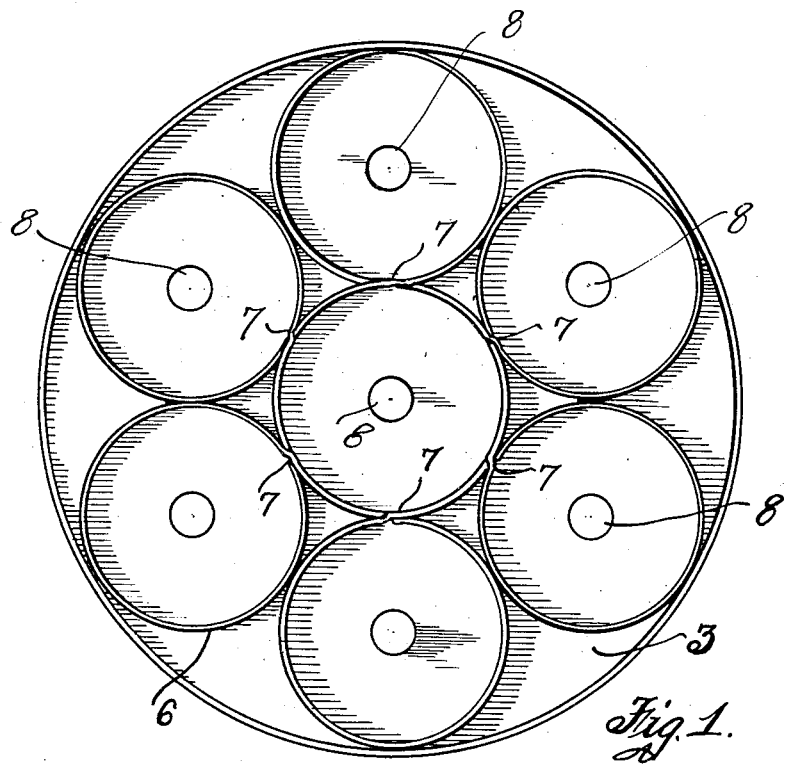
Figure 1 is a bottom plan view of my invention.
Figure 2:
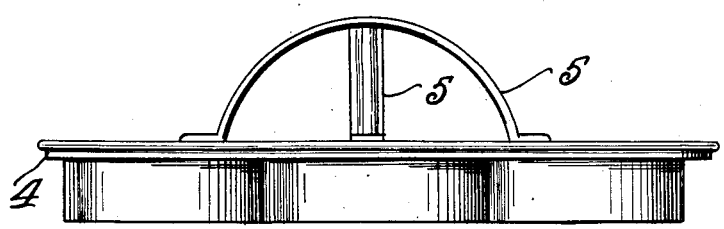
Fig. 2 is a side view of my invention.

3 indicates an annular plate preferably stamped from tin or other suitable metal, having its outer circumference flanged downwardly as at 4 to strengthen and keep the plate 3 from bending. 5 is a set of handles suitably attached to the top face of the plate 3. 6 indicates a series of annular cutting members formed from strip material with their upper edges suitably attached to the under face of the plate 3. These may be of any size for different purposes. One end 7 of each of the cutting members is bent inwardly and proceeds to form a section of an inner cutting member. This end extends to where the next consecutive end extends outward from the next consecutive cutting member so that I will provide an inner cutting member encircled with a series of cutting members, which center cutting member is formed by the ends of said encircling cutting members as will be shown in Fig. 1 of the drawings.

The plate 3 is provided with openings 8 centrally of each of the cutting members so as to allow air to pass out when the cutting members are pressed into the dough.

From the above it will be seen that I provide a cheap and efficient utensil for cutting dough mixtures.

From the foregoing it is thought that the construction of my invention will be clearly understood, and, therefore, a more extended explanation has been omitted.

What I claim as new is:—

1. A cake cutter consisting of a plate, the circumference of said plate being flanged downward, suitable handles attached to the upper side of said plate, cutting members attached to the under side of said plate, said cutting members consisting of strips with one side attached to the under side of said plate and one end of each of said strips forming a complete cutting member and a section of a central cutting member with an end of two adjacent strips abutting on opposite sides of a complete cutting member.

2. A cake cutter consisting of a plate, the circumference of said plate being flanged downward, suitable handles mounted on the upper side of said plate, annular cutting members formed of strip material, one edge of said material being suitably attached to the under side of said plate, each strip forming a complete cutting member and a portion of an adjacent cutting member, and one end of each of said strips extending to the joining point of the next consecutive cutting member with an end of two adjacent strips abutting upon opposite sides of a strip to form a central cutting member.

3. A cake cutter consisting of a plate, the circumference of said plate being flanged downward, suitable handles mounted on the upper side of said plate, annular cutting members formed of strip material, one edge of said material being suitably attached to the under side of said plate, each strip forming a complete cutting member and a portion of an adjacent cutting member, one end of each of said strips extending to the joining point of the next consecutive cutting member to form a central cutting member, each strip being formed with a bend with an end of the adjacent strips engaging on opposite sides of said bend, and air openings through said plate for each of said cutting members.

In testimony whereof I affix my signature in the presence of two witnesses.

LAURA C. TRETHEWEY.

Witnesses:
JANE DANIELS,
JANE A. VIVIAN.